United States Patent [19]
Stallmo et al.

[11] Patent Number: 5,787,459
[45] Date of Patent: *Jul. 28, 1998

[54] DISTRIBUTED DISK ARRAY ARCHITECTURE

[75] Inventors: David C. Stallmo; William A. Brant; Randy Hall, all of Boulder, Colo.

[73] Assignee: EMC Corporation, Hopkinton, Mass.

[*] Notice: The term of this patent shall not extend beyond the expiration date of Pat. No. 5,689,678.

[21] Appl. No.: 579,553

[22] Filed: Dec. 27, 1995

Related U.S. Application Data

[63] Continuation of Ser. No. 415,157, Mar. 31, 1995, Pat. No. 5,689,678, which is a continuation of Ser. No. 29,794, Mar. 11, 1993, abandoned.

[51] Int. Cl.$^6$ ................................................ G06F 13/368
[52] U.S. Cl. .................. 711/112; 711/148; 711/113; 711/114; 371/40.15; 395/200.31; 395/200.81; 395/200.83; 395/293; 395/308; 395/730; 395/800.28
[58] Field of Search ....................... 395/800, 445, 395/446, 447, 448, 449, 455, 431, 439, 440, 441, 412, 416, 182.04, 182.05, 730, 200.31, 200.81, 293, 800.28; 711/112, 114, 113, 148; 371/40.15

[56] References Cited

U.S. PATENT DOCUMENTS

| | | | |
|---|---|---|---|
| 5,043,873 | 8/1991 | Muramatsu et al. | 395/800 |
| 5,148,432 | 9/1992 | Gordon et al. | 395/182.05 |
| 5,208,813 | 5/1993 | Stallmo | 395/182.05 |
| 5,357,632 | 10/1994 | Pian et al. | 395/675 |
| 5,459,857 | 10/1995 | Ludlam et al. | 395/182.04 |

OTHER PUBLICATIONS

Wilkes, John DataMesh—Parallel Storage Systems for the 1990's; 11th EEE Mass Storage Symposium, Oct. 1991.
Jacobson, et al.; Disk Scheduling Alogrithms Based on Rotational Position; Technical Reports HPL-CSP-91-7, Feb. 26, 1991—Hewlett-Packard Company.
Wilkes, John; DataMesh—Scope and Objectives; HPL-DSD-8937 rev.1, Jul. 19, 1989.
Wilkes, John; DataMesh—Scope and Objectives: A Commentary; Technical Report HPL-DSD-89-14, Jul. 19, 1989—Hewlett-Packard Company.
Ruemmler, Chris, et al; Disk Shuffling; HPL-SCP-91-30, Oct. 3, 1991.
English, Robert M., et al., Loge: A Self–Organizing Disk Controller; HPL-91-179, Dec. 1991—Hewlett Packard Company.
Cao, Pei et al.; The TickerTAIP Parallel RAID Architecture; HPL-92-151, Dec. 1992—Hewlett Packard Company.

*Primary Examiner*—Tod R. Swann
*Assistant Examiner*—Denise Tran
*Attorney, Agent, or Firm*—William J. Kubida, Esq.; Richard A. Bachand, Esq.; Holland & Hart LLP

[57] ABSTRACT

A RAID-compatible data storage system which allows incremental increases in storage capacity at a cost that is proportional to the increase in capacity. The system does not require changes to the host system. The control and interface functions previously performed by a single (or redundant) central data storage device controller are distributed among a number of modular control units (MCUs). Each MCU is preferably physically coupled to a data storage device to form a basic, low-cost integrated storage node. One of two bus ports interfaces an MCU with the host computer on a host bus, and the other bus port interfaces an MCU with one or more data storage devices coupled to the MCU by a data storage device bus. The serial interface ports provide a means by which each of the MCUs may communicate with each other MCU to facilitate the implementation of a memory array architecture. The entire data storage array may appear as a single device capable of responding to a single identification number on the host bus, or may appear as a number of independent device. A controlling MCU receives a command and notifies the other MCUs that are involved in a read or write operation. Control of the host bus is transferred from one MCU to the next MCU in sequence so that the data is received by the host computer, or written to each data storage device, in the proper order.

29 Claims, 10 Drawing Sheets

DISTRIBUTED DISK ARRAY ARCHITECTURE

This is a continuation of application Ser. No. 08/415,157 filed Mar. 31 1995 patented U.S. Pat. No. 5,689,678 which is a continuation of application Ser. No. 08/029,794 filed Mar. 11, 1993, now abandoned.

BACKGROUND OF THE INVENTION

1. Field of the Invention

This Invention relates to data storage systems, and more particularly to a method and apparatus for storing data on multiple redundant data storage devices.

2. Description of Related Art

As computer use increases, data storage needs have increased even more. In an attempt to provide large amounts of data storage that is both inexpensive and reliable, it is becoming increasingly common to use large numbers of small, inexpensive data storage devices which work in unison to make available a reliable large data storage capacity. In a paper entitled "A Case for Redundant Arrays of Inexpensive Disks (RAID)", Patterson, et al., *Proc. ACM SIGMOD*, June 1988, the University of California at Berkeley has catalogued a set of concepts to address the problems of pooling multiple small data storage devices. The Patterson reference characterizes arrays of disk drives in one of five architectures under the acronym "RAID".

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives. For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for on-one Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" X(OR'd) to generate parity information. The resulting parity information is stored in a single redundant storage unite. If a storage unit fails, the data on that unit can be reconstructed onto a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 184 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that writing a data block on any of the independently operating storage units also requires writing a new parity block on the parity unite. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" (RMW) operation.

Thus, a read and a write operation on the single parity unit occurs each time a record is changed on any of the storage units covered by a parity record on the parity unit. The parity unit becomes a bottle-neck to data writing operations since the number of changes to records which can be made per unit of time is a function of the access rate of the parity unit, as opposed to the faster access rate provided by parallel operation of the multiple storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage device containing parity for the N data blocks of the stripe. Further stripes each have a parity block the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

In addition to the five RAID architectures, a sixth architecture is sometimes referred to as "RAID 0", even though it lacks redundancy. RAID 0 is a collection of data storage devices in which data is spread (striped) over several data storage devices to achieve higher bandwidth, but with no generation or storage of redundancy information.

All of the conventional RAID configurations use a central data storage device controller to coordinate a transfer of data between a host computer and the array of data storage devices. The central data storage device controller (1) determines to which particular data storage device within an array to write data, (2) generates and writes redundancy information, and (3) reconstructs lost data from the redundancy information upon a failure of a data storage device. FIG. 1 is an example of such a system. A central data storage device controller 1 is coupled to a host computer 2 by a host bus 3. A plurality of data storage devices 4 are coupled to the data storage device controller 1 by a plurality of device buses 5. The data storage device controller 1 distributes data over the bus 3 to each of the data storage devices 5. A system in which a redundant data storage device controller is added to eliminate the data storage device controller as a single point of failure is taught in a co-pending application owned by the assignee of the present invention (U.S. patent application Ser. No. 07/852,374).

However, in RAID systems which use a central data storage device controller to manage individual data storage devices, the full expense of a controller capable of controlling the maximum number of data storage devices is needed, even if only a few data storage devices (such as 3, the minimum number for a true RAID 3 or 5 system) are to be used for a particular computer system. This means that the central data storage device controller must: (1) be capable of supporting communications between the maximum number of data storage devices, (2) have sufficient internal buffer memory to allow the data storage device controller to receive and manage data destined for the maximum number of data storage devices, (3) be capable of handling a sufficiently large number of interrupts to communicate with a host computer and each data storage device, and (4) be fast enough to handle management functions associated with the maximum number of data storage devices in a RAID configuration.

Also, the addition of more data storage devices than can be handled by a single data storage device controller requires another data storage device controller to be added to the computer system. Therefore, the cost of expansion is a steep step function (i.e., the cost of adding additional data storage capacity increases in relatively small increments for data storage devices, up to the point at which an additional controller must be added, at which time the cost of expansion increases by a much larger increment to pay for the added controller).

In light of the foregoing, there is a need for a RAID-compatible data storage system having a control system for managing a RAID array in which each incremental increase in data storage capacity is made at a cost that is proportional to the increase in capacity. It would also be desirable if such a data storage system could be implemented so that no changes need be made to a host computer.

The present invention provides such a data storage system.

SUMMARY OF THE INVENTION

The present invention is a RAID-compatible data storage system which allows incremental increases in storage capacity at a cost that is proportional to the increase in capacity. The control and interface functions previously performed by a single (or redundant) central data storage device controller are distributed among a number of modular control units (MCUS) cooperatively operating in parallel. In the preferred embodiment, each MCU is physically coupled to a data storage device to form a basic, low-cost integrated storage node. Additional data storage devices may be added to this basic storage node. The system does not require changes to the host system.

In the preferred embodiment of the present invention, each MCU includes at least two bus interface ports, one or two serial interface ports, a processor optimized for inter-processor communications control and management, random access memory (RAM), and read-only memory (ROM). One of the bus ports interfaces an MCU with the host computer on a host bus, and the other bus port interfaces an MCU with one or more data storage devices coupled to the MCU by a data storage device (DSD) bus. The MCU's are preferably interlinked in a ring configuration through the serial interface ports. The MCU's use a "store and forward" protocol for passing control information around the ring.

The serial interface ports provide a means by which each MCU may communicate with each other MCU to facilitate the implementation of a memory array architecture, such as a RAID architecture. Paired MCUs can be configured as a RAID 0 or 1 system, and three or more MCUs can be configured as a RAID 0, 3, 4, or 5 system. Increments in storage capacity can be made by adding data storage devices to the DSD bus of one or more MCUs ("vertical" expansion), or by adding additional MCUs with at least one attached data storage device ("horizontal" expansion).

Indenification on numbers or codes are "logically" assigned to each MCU coupled to the host bus, and MCU's can monitor, or "snoop", the host bus. Therefore, the entire data storage array (including a plurality of MCUs) may appear as a single device capable of responding to a single identification number on the host bus, or may appear as a number of independent devices, each having discrete identification numbers on the host bus. The ability to have more than one MCU appear to the host computer as a single node on the host bus means that the only limit on the number of MCUs that can be present on the host bus is the physical and electrical limitations imposed by the ability of the bus drivers and receivers to reliably transmit the signals between the host computer and each MCU.

In addition to the MCUs, other devices, such as conventional storage arrays or stand-alone data storage devices, may be coupled directly to the host bus. Thus, additional peripheral devices may be directly accessed by all of the MCUs across the host bus, as well as by the host computer.

When the host computer requests that data be read from, or written to, one or more data storage devices through one or more MCUs, one of the MCUs connects over the host bus with the host computer to serve as a controlling MCU. The controlling MCU receives a copy of a command descriptor block (CDB) that specifies an input/output operation and the data blocks involved in the operation. The controlling MCU then notifies the other MCUs that are involved in the read or write operation. For a read operation, each MCU coupled directly by its DSD bus to one or more data storage devices on which at least part of the requested data is stored begins requesting data from the appropriate data storage device or devices. Control of the host bus is passed to the MCU which is coupled to the data storage device from which, or to which, the first data block is to be read or written. If that data storage device is available upon transfer of control of the host bus to that "lead" MCU, data is transferred between the host computer and the lead MCU without disconnecting the host computer from the host bus. However, if that data storage device is not available when the lead MCU takes control of the host bus, then the host computer is disconnected from the host bus. The lead MCU is responsible for reestablishing the connection to the host computer when that data storage device becomes available.

Control of the host bus is transferred from the lead MCU to the next MCU in sequence, which reads or writes the next data block, so that data is received by the host computer, or written to each data storage device, in proper order. When the last block is transferred between the host computer and an MCU across the host bus, the MCU that made the last transfer sends a "complete" message to the host computer and disconnects from the host bus. In the preferred embodiment of the present invention, the last MCU to communicate with the host computer in response to a particular request directed to a logical MCU identification number is responsible for servicing future requests from the host computer directed to that identification number.

The invention also encompasses the use of data caching to improve performance, and "warm spares" of data storage devices to provide for on-line automatic rebuilds of data stored on a failed data storage device.

In addition to the above advantages, the invention provides a host computer with a large amount of data storage while appearing to the host computer as one or more large standard storage devices. The invention allows a significant increase in system performance by providing concurrent input/output operations by a number of data storage devices without changes to the host computer. The invention also provides a relatively low-cost, approximately linear expansion capability.

The details of the preferred embodiment of the present invention are set forth in the accompanying drawings and the description below. Once the details of the invention are known numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

System Architecture

The present invention is a RAID-compatible method and apparatus for interfacing a host computer with a plurality of data storage devices such that the control and management of each data storage device is transparent to the host computer (i.e., requires no special changes to the host computer). Control of the plurality of data storage devices is distributed among a plurality of Modular Control Units (MCUs) so that the cost of expanding data storage is proportional to the incremental increase in capacity of the data storage.

Figure 1:
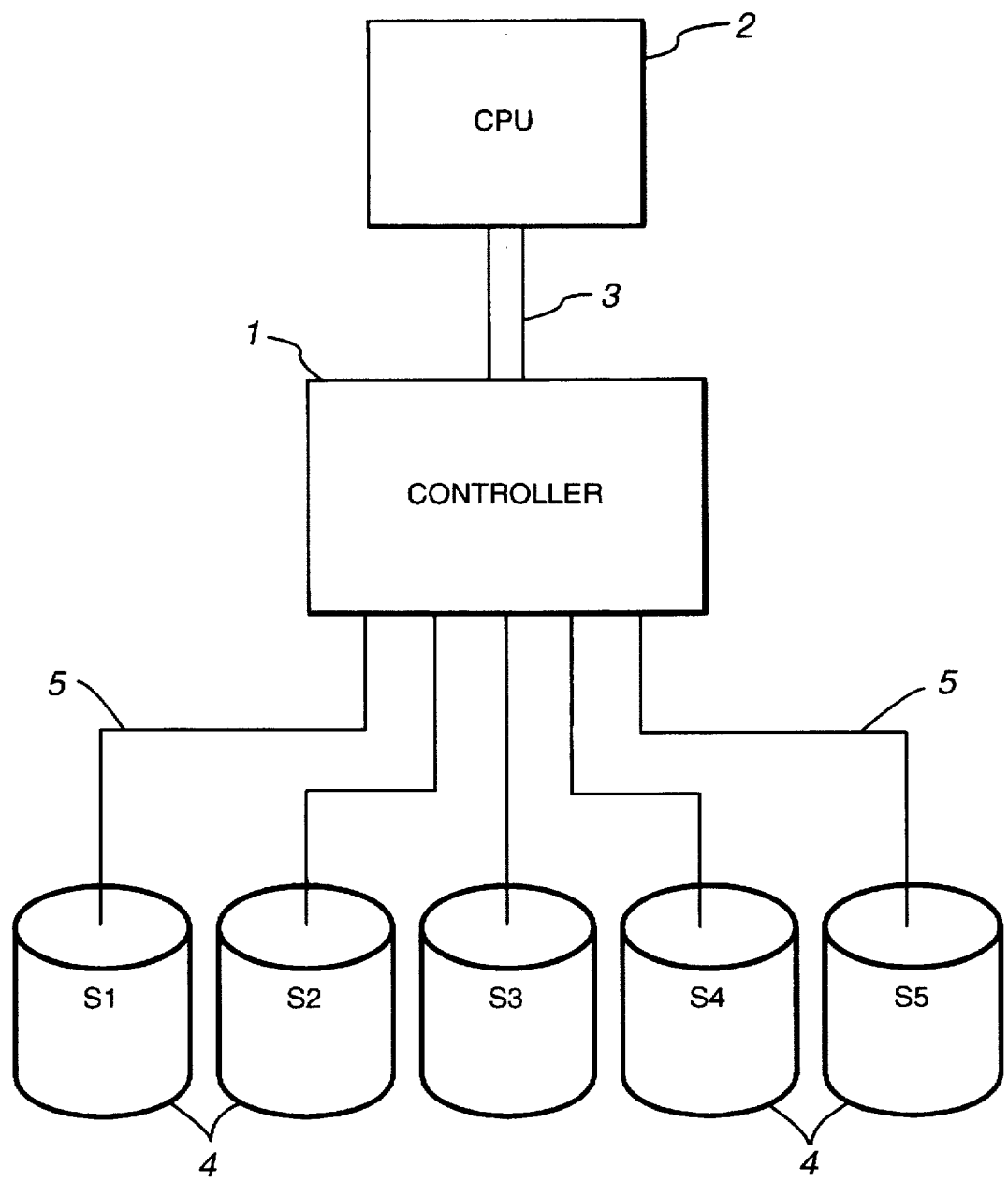
FIG. 1 is a block diagram of a prior art RAID configuration.
Figure 2:
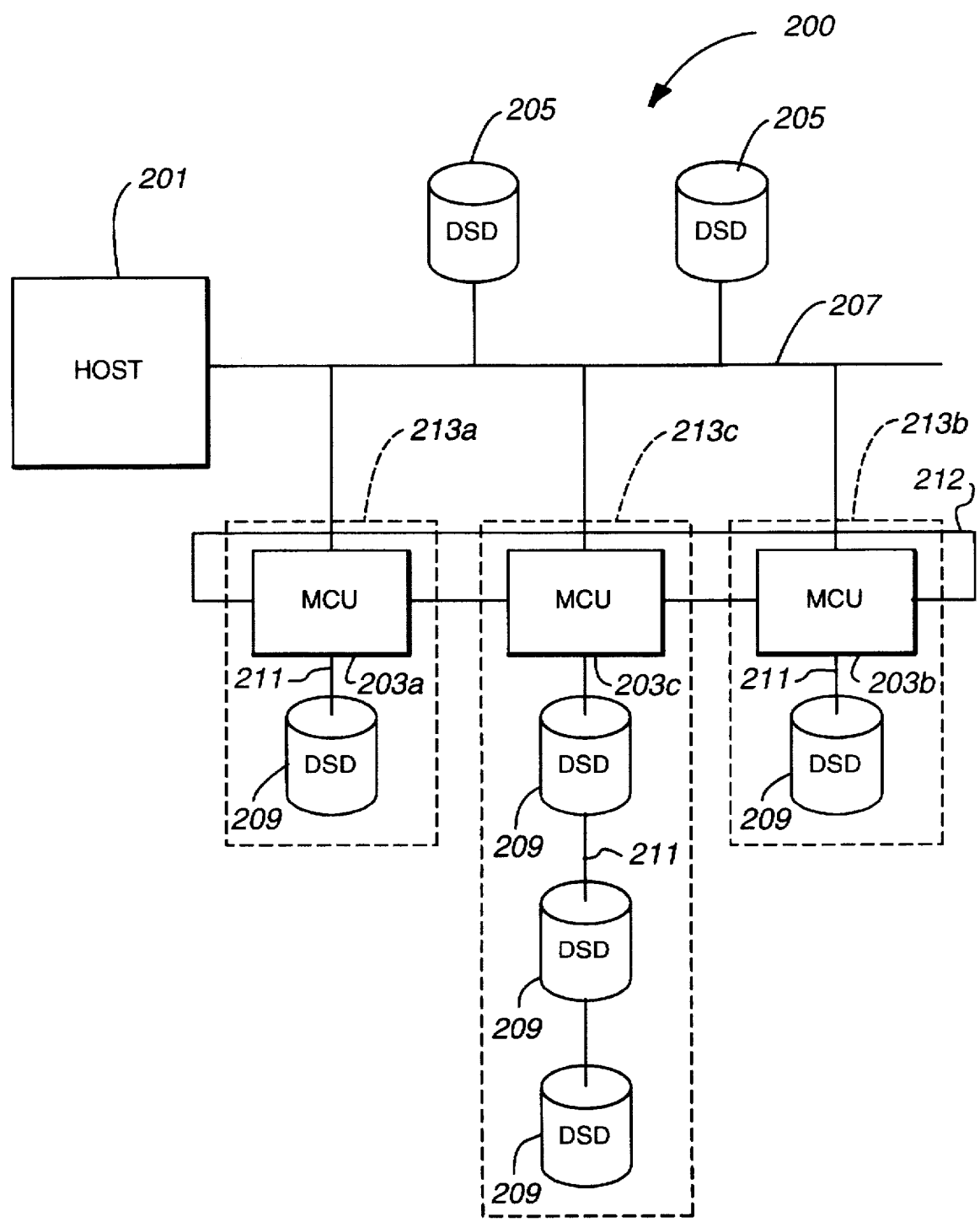
FIG. 2 is a block diagram of one configuration of the present invention.

FIG. 2 is a simplified block diagram of the preferred embodiment of the present invention. A distributed disk array architecture 200 is shown which includes a host computer 201 coupled by a host bus 207 to three MCUs 203 and two stand-alone data storage devices 205. The host bus 207 is preferably the well-known Small Computer System Interface (SCSI) bus. Use of a standard SCSI bus (or the newer SCSI II bus) means that the host computer 201 communicates with the MCUs 203 in a standard way, without special changes to the host computer 201 and without requiring a costly custom bus.

Each MCU 203 is also coupled to at least one data storage device 209 by a data storage device (DSD) bus 211, which is preferably a SCSI bus. FIG. 2 shows three DSD buses 211. Each is independent of the other and of the host bus 207.

The combination of an MCU 203 and at least one data storage device 209 coupled to the MCU 203 is referred to as a "node" 213. In the illustrated embodiment shown in FIG.

2. one data storage device 209 is coupled by a DSD bus 211 to a first MCU 203a to define a first node 213a. Similarly, one data storage device 209 is coupled to a second MCU 203b, and three data storage devices 209 are coupled to a third MCU 203c, to define second and third nodes 213b, 213c, respectively.

The preferred embodiment is described herein as using SCSI buses for the host bus 207 and the DSD bus 211. The SCSI and SCSI II buses are well-known, and SCSI compatible data storage devices 209 are inexpensive and widely available. An advantage of both types of SCSI bus is that they allow a data storage device 209 on the bus to logically "disconnect" from the bus while performing a seek operation and transferring data to/from a local track buffer in the data storage device 209. As described below, this disconnect feature is useful in implementing the present invention. However, use of SCSI buses in the illustrated embodiment is described only as an example of the preferred implementation of the present invention. It should be understood that the present invention is not limited to use only with SCSI buses.

Figure 3:
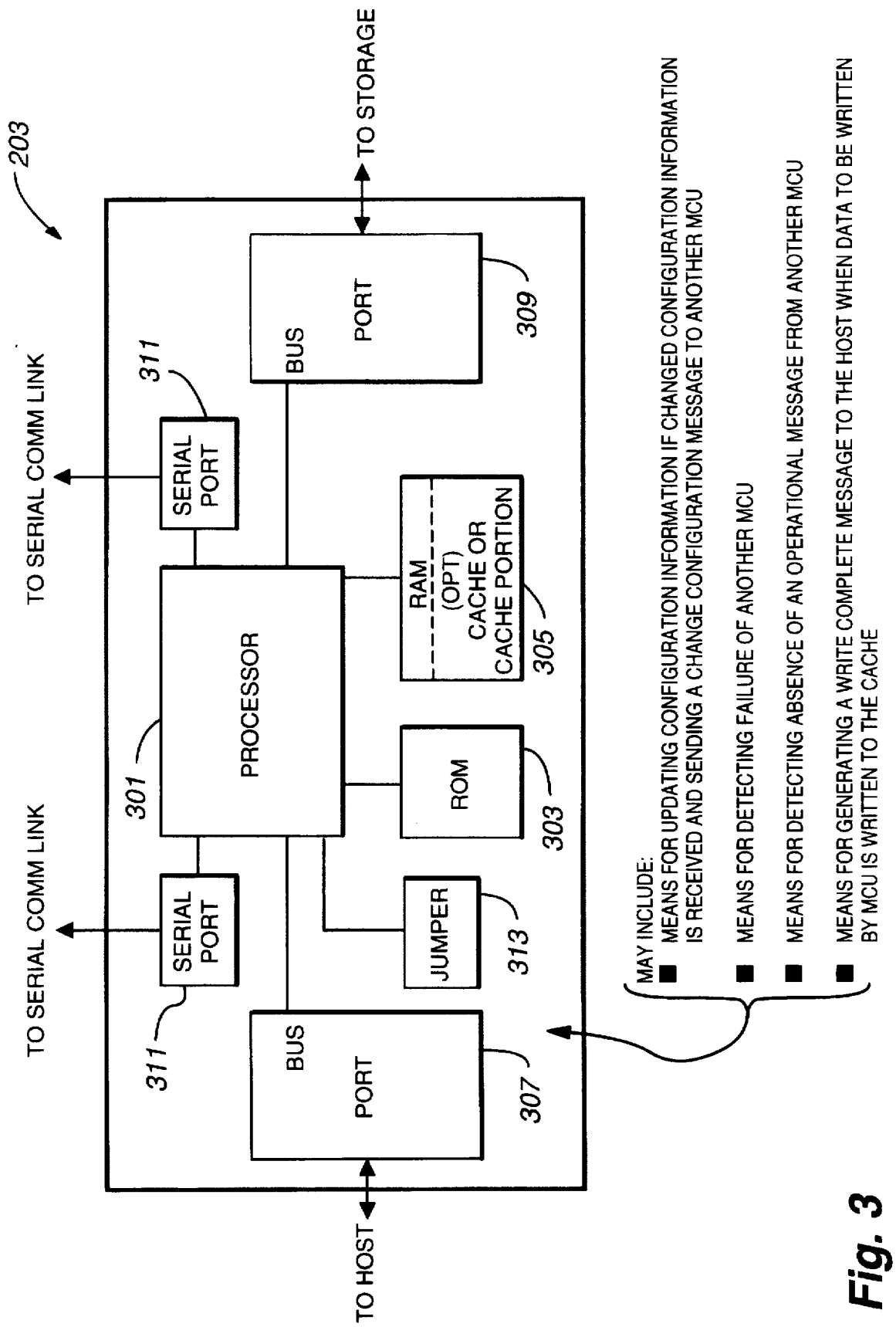
FIG. 3 is a block diagram of a modular control unit in accordance with the preferred embodiment of the present invention.

Each MCU 203 preferably has two additional communications ports, such as serial ports 311 (see FIG. 3). At least one of the serial ports 311 is coupled to a serial port 311 of an adjacent MCU 203, as shown in FIG. 2, to form a serial communications link 212 between an array of nodes 213. Although MCUs 203 can communicate with each other over the host bus 207, normal control messages are passed between MCUs 203 only over the serial communications link 212.

In the preferred embodiment of the present invention, each MCU 203 has two serial ports 311, each of which is coupled to a serial port of an adjacent MCU 203 to form a bi-directional ring network, as shown in FIG. 2 This arrangement allows communications to continue between the array of nodes 213 even if one MCU 203 fails. However, a single serial port 311 in each MCU 203 could be used in conjunction with a standard network bus configuration. In any case, messages can be passed between nodes 213 on the serial communications link 212 without participation by the host 201 or interference with communications on the host bus 207. The serial communications link 212 preferably operates as a store-and-forward network, in known fashion.

The MCUs 203 interface each of their coupled data storage devices 209 to the host computer 201 to allow the host computer 201 to write data to, and read data from, the array of data storage devices 209 in the linked nodes 213 such that control of the array is transparent to the host computer 201. From the perspective of the host computer 201, a large capacity data storage device appears to reside at each of a selected number of host bus addresses (such as SCSI identification numbers) and appears to be equal in capacity to a number of the data storage devices 209 taken together. The apparent data storage capacity at each host bus address on the host bus 207 need not be the same as the apparent storage capacity at each other host bus address.

In the preferred embodiment of the present invention, data is stored on the data storage devices 209 in units known as "blocks" (which may be, for example, a sector on a disk drive). Data blocks are organized into "logical disks". One or more logical disks may be located on a physical data storage device 209. Each logical disk comprises a portion of a physical data storage device 209, and is defined by a physical data storage device number, starting block number, and number of blocks. Logical disks are organized into "logical volumes". Each logical volume comprises one or more logical disks, all having the same number of blocks. A logical volume may include the logical disks stored on one or more physical data storage devices 209. Logical volumes are organized into "redundancy groups". Each redundancy group comprises one or more logical volumes, all having the same "striping depth". The striping depth is the number of data blocks that are consecutively written to a single logical disk before starting to write blocks to a next logical disk.

In the preferred embodiment of the present invention, the host computer 201 is responsible for setting the configuration of logical disks and volumes. This may be done, for example, in the manner described in U.S. patent application Ser. No. 07/612,220, entitled "Logic Partitioning of a Redundant Array Storage System", and assigned to the assignee of the present invention. In addition, a SCSI identification number is associated with a respective logical volume. (Alternatively, a Logical Unit Number, or LUN, is associated with a respective logical volume.) Data is striped across all of the logical disks in a logical volume using the associated striping depth. When the host computer 201 requests a read or write operation to one of the data storage devices 209, the host computer refers to the logical address (i.e., logical disk and volume). When the invention is implemented using a SCSI host bus 207, input/output (I/O) requests are made using a command descriptor block. As is known in the art, a SCSI command descriptor block is typically a 6, 10, or 12 byte block that contains an operation code (e.g., a "Read" or "write" code), the logical volume number to which the operation is directed, the logical block address for the start of an operation, and the transfer length (in blocks) if the operation code involves a data transfer.

MCU Architecture

FIG. 3 is a simplified block diagram of an MCU 203 in accordance with the preferred embodiment of the present invention. Each MCU 203 preferably includes a processor 301 coupled to a read-only memory (ROM) 303, a random access memory (RAM) 305, a first bus interface 307, a second bus device 309, and at least two serial interfaces 311. The first bus interface 307 is coupled to the processor 301 and to the host bus 207. The second bus interface 309 is coupled to the processor 301 and to a DSD bus 211. The first and second bus interfaces 307, 309 may be implemented, for example, using the NCR 53C90, 53C94, or 53C700 SCSI interface integrated circuits.

The processor 301 is preferably a "Transputer" from Inmos Corporation. "Transputer" processors are specifically designed for interprocessor communications over serial links at current rates of 10 to 20 Mbits per second. Transputer process are also designed to handle interrupts quickly, and are thus well-suited for use in controllers. However, other processors, such as RISC processors, could also be used to implement the invention.

In the preferred embodiment each of the MCUs 203 is physically mounted on one data storage device 209. Additional data storage devices 209 may be "daisy chained" to an MCU 203 by appropriate cable connection. The power and data/control connectors of the data storage device 209 upon which an MCU 203 is mounted are connected to the MCU 203. The MCU 203 has power and data/control connectors that mimic the power and data/control connectors of the data storage device 209. The data/control and power connectors of the MCU 203 are respectively coupled to the host bus 207 and to the data storage device power source (not shown) in place of the connectors of the data storage device 209. The MCU 203 preferably is physically configured to conform to the form factor (e.g., 5¼" or 3½") of the attached data storage device 209 so that the MCU 203 can be retrofit into pre-existing systems.

In one embodiment of the present invention, the software that controls the operation of the processor 301 of each MCU 203 is stored in the ROM 303. Upon initial application of power to the MCU 203, the processor 301 is "hard" vectored to a start address in the ROM 303. In an alternative embodiment of the present invention, the ROM 303 only provides instructions which point to software code in a data storage device 209 coupled to the MCU 203 on the DSD bus 211 or over the host bus 207. In the alternative embodiment, the ROM 303 provides instructions to load the software code from the data storage device 209 into the RAM 305 local to the processor 301. In another embodiment of the present invention, the control software code may be stored in an electrically erasable read only memory (EEROM), electrically alterable read only memory (EAROM), or a similar non-volatile, re-programmable memory device. The host computer 201 downloads the software code to the MCU 203 and it causes the software code to be written into such a memory device by issuing instructions to the MCU 203 across the host bus 207. By granting the host computer 201 the ability to alter the software code run by the MCU processor 301, updates to the software code can be made easily to operational MCUs 203 in the field.

In the preferred embodiment of the present invention, a number of host bus addresses (such as SCSI LUN identification numbers) are assigned to the array of MCUs 203. However, in the preferred embodiment, the number of MCUs 203 can exceed the number of host bus addresses. The host bus address assigned to an MCU 203 is indicated by a host bus address identification means 313 (such as a jumper, programmable read only memory, dip switch, detachable connection, or any other means for indicating an address). If the number of MCUs 203 exceed the number of available host bus addresses, the one MCU 203 is associated with each unique host bus address. The host bus address identification means 313 for each remaining MCU 203 is configured to indicate "no address". In any case, each MCU 203 preferably may respond to any of the host bus addresses assigned to the array of nodes 213. That is, each MCU 203 "snoops" on the host bus 207 for addresses, command, and data, and can request and receive control of the host bus 207.

Because host bus addresses or identification numbers are "logically" assigned to each MCU coupled to the host bus 207, the entire data storage array may appear as a single device capable of responding to a single identification number on the host bus 207, or may appear as a number of independent devices, each having discrete identification numbers on the host bus 207. The ability to have more than one MCU 203 appear to the host computer 201 as a single node 213 on the host bus 207 means that the only limit on the number of MCUs 203 that can be present on the host bus 207 is the physical and electrical limitations imposed by the ability of the bus drivers and receivers to reliably transmit the signals between the host computer 201 and each MCU 203.

In the preferred embodiment each MCU 203 maintains an identical configuration data structure that describes the network of MCUs 203, data storage devices 209 coupled to DSD buses 211, and data storage devices 205 coupled directly to the host computer 201 on the host bus 207. Each MCU 203 determines what devices are coupled to its DSD bus 211 and the characteristics of those devices (e.g., data block size, number of data blacks, etc.) by issuing a query on its DSO bus 211 for each DSD bus identification number. Each MCU 203 communicates its own configuration data structure to each other MCU 203. If an MCU 203 receives a configuration data structure that differs from the current configuration data structure that MCU 203 is maintaining, the receiving MCU 203 updates its configuration data structure to reflect the new information received and forwards the new configuration data structure to the other MCUs 203 to bring them up to date. In addition, when any change is sensed in the configuration of a node 213 (for example, an attached data storage device 209 fails), that node 213 updates the configuration data structure and sends a "change configuration" message to each other MCU 203. Through this process, each node 213 will eventually have an exact duplicate of the system configuration data structure.

Figure 4:
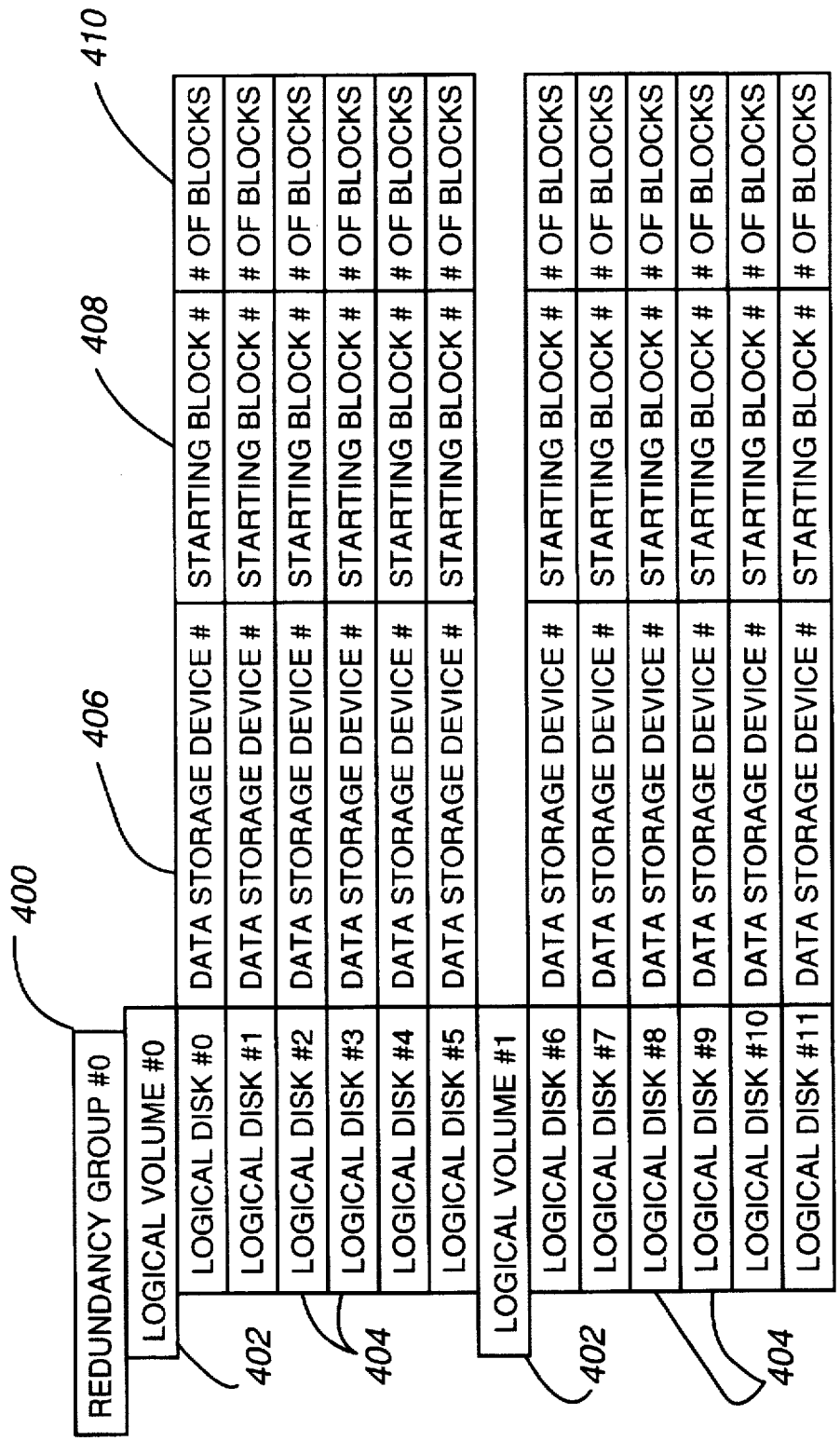
FIG. 4 is a diagram of a logical system configuration in accordance with the preferred embodiment of the present invention.

FIG. 4 is a diagram of a logical system configuration in accordance with the preferred embodiment of the present invention. The logical system configuration is preferably a table that defines the array of data storage devices 209 in terms of redundancy groups 400, logical volumes 402, and logical disks 404. As noted above, each logical disk is defined by a physical data storage device number 406, starting block number 408, and number of blocks 410. One method of defining an array of disks in this manner is disclosed in co-pending, co-owned U.S. patent application Ser. No. 07/612,220, the teachings of which are hereby incorporated by reference. However, the invention encompasses any method of mapping the blocks of the array of physical data storage devices 209 so as to be able to translate a host I/O request into locations for the relevant blocks.

In the preferred embodiment of the present invention, the logical system configuration data structure is written to the data storage device 209 on which the MCU 203 is mounted. The logical system configuration data sire is preferably time-stamped so that when an MCU 203 initializes itself, that MCU 203 can determine whether the configuration data structure which that MCU 203 reads from the data storage device 209 is current. This determination can be made by each MCU 203 broadcasting its time-stamps to every other MCU 203. Each MCU 203 then compares its time-stamp to each received time-stamp. If the MCU 203 determines that the configuration data structure read during initialization is not current, the MCU 203 queries one of the other nodes 213 for a copy of the configuration data structure maintained by that node 213. Preferably, the queried node is one that has the most current time-stamp.

In contrast to the addressing scheme of the host bus 207, each data storage device 209 is assigned to a particular address on each DSD bus 211 and responds only to that bus address. Therefore, each data storage device 209 of the preferred embodiment of the present invention has a unique address among the devices connected to the same DSD bus 211.

Through the logical system configuration data structure, each MCU 203 can determine the address of each other MCU 203 located on the serial communications link 212. The determination as to which of the two serial ports 311 of an MCU 203 a message is transmitted through is based upon which direction yields the shortest possible route, as determined by referring to the logical system configuration data structure. In the preferred embodiment of the present invention, messages from one node 213 to another are received by an adjacent node 213. If the message is not addressed to that node 213, the message is sent to the next adjacent node 213 on the path to the destination node. Such "store and forward" communications links are well-known in the art.

In the preferred embodiment, each MCU 203 transmits an "operational" message at time intervals to the two MCUs 203 to which it is directly coupled by the serial ports 311. Therefore, whenever one of the MCUs 203 fails, at least two other MCUs 203 in the ring are made aware of the failure by the fact that an expected "operational" message has not been received. The first MCU 203 to detect the failure of another MCU 203 to transmit the "operational" message, generates a "configuration change" message and transmits the change to each of the other nodes 213. If the node 213 that was detected as having failed has, in fact, not failed, then when it receives the configuration change it transmits a "operational error" message which is received by the two adjacent nodes 213 (only one, in the case in which one leg of the serial communications link 212 itself has failed). The "operational error" message is forwarded to each node 213 on the serial communication link 212. Therefore, when the node 213 that sent the configuration change receives the message, that node 213 determines that the serial communications link 212 itself has a defect and marks that defect in the logical system configuration data structure. The revised logical system configuration data structure is then forwarded to all other nodes 213.

In the preferred embodiment of the present invention, each MCU 203 has sufficient RAM 305 to cache data being handled by that MCU 203 for most I/O transactions. The cache allows a "write complete" message to be sent to the host computer 201 immediately upon receipt of data to be written by each MCU 203 (i.e., data need not actually be written to an attached data storage device 209 before the "write complete" message is sent from an MCU 203 to the host computer 201).

The size of the cache determines how busy the node 213 can be and still handle a transfer without logically disconnecting to allow the MCU 203 to complete a pending I/O operation. Some of the factors that determine the size of the cache are the size of a data block to be written to the data storage device 209 and the speed of the data storage device 209 with respect to the speed of the host bus 207 and the DSD bus 211. If it becomes necessary to disconnect from the host computer 201, the host computer 201 must wait until the busy MCU 203 has sufficient memory available in the cache to accept a rug data block from the host computer 201. At that time, the disconnected MCU 203 reestablishes the connection with the host computer 201 using the host bus address of the original I/O request made by the host computer 201.

A second way of implementing a cache is to dedicate one MCU 203 to caching, and use RAM or some other fast storage device in place of a data storage device 209. This "cache" MCU would provide caching for the entire array of nodes 213.

Overview of Operation

Using the present invention, paired MCUs 203 can be configured as a RAID 0 or 1 system, and three or more MCUs 203 can be configured as a RAID 0, 3, 4, or 5 system. In such RAID-type configurations, it is the responsibility of each MCU 203 to coordinate I/O operations including any read-modify-write operations and data rebuild operations) in such a manner as to make the combination of several data storage devices 209 appear to the host computer 201 as a single, large capacity, high bandwidth, reliable data storage device. To accomplish this goal, one of the MCUs 203 is initially responsible for responding to an I/O request from the host computer 201 to either read a block of data from, or write a block of data to, the array of data storage devices 209. That "controlling" MCU 203 determines from which, or to which, data storage device 209 the first data block of the requested data is to be read or written. That is, after receiving a data transfer request from the host computer 201, the MCU 203 that initially responded determines from the logical system configuration data structure which data storage devices 209 will be involved in the requested operation (i.e., the locations of the logical blocks that together comprise the data specified in the host computer's I/O request), and with which MCUs 203 those data storage devices 209 are associated. An MCU 203 is "involved" in a data operation if any portion of the data referenced in an I/O request (or associated redundancy information) is to be written to, or read from, a data storage device 209 coupled to that MCU 203.

Responsibility for communicating with the host computer 201 in response to the request is passed to the "lead" MCU 203 that is associated with the data storage device 209 to which, or from which, the first data block is to transferred. That "lead" MCU 203 then begins the transfer of the data to or from the host computer 201.

Transfer of control and coordination among the MCWs 203 is accomplished by messages transmitted over the serial communications link 212. Control is transferred from the lead MCU 203 to the next MCU 203 in sequence so that each data block is received by the host computer 201, or written to each data storage device 209, in proper order. When the last data block is transferred between the host computer 201 and an MCU 203 across the host bus 207, the MCU 203 that made the last transfer sends a "complete" message to the host computer 201 and disconnects from the host bus 207.

Coordination between MCUs 203 ensures that only one MCU 203 responds at any one time to an I/O request by the host computer 201 on the host bus 207. In one embodiment of the present invention, the last MCU 203 to have responded to a particular I/O request from the host computer 201 directed to a particular host bus address is responsible for responding to the next I/O request made to that host bus address.

In another embodiment of the present invention, one particular MCU 203 is assigned primary responsibility for responding to an I/O request to a particular host bus address. That MCU 203 may pass responsibility for servicing requests on that host bus address to another MCU 203 by sending a message to the other MCUs 203 with a command to service the request.

The controlling MCU 203 is responsible for coordinating the communication between the host computer 201 and the other MCUs 203 that are involved in an I/O operation. However, the controlling MCU 203 need not be coupled to one of the data storage devices 209 to which data is to be written. For example, if the data storage devices 209 coupled to an MCU 203 fail, but the MCU is otherwise operational, that MCU 203 can be selected as the controlling MCU, thus off-loading some processing tasks from other MCUs 203. As another example, the controlling MCU 203 may be busy, causing I/O requests from the host computer 201 to be delayed. If the nominal controlling MCU 203 is sufficiently occupied, it selects another MCU 203 to control any new I/O request from the host computer 201. This transfer of responsibility can continue through other MCUs 203. The determination as to which MCU 203 to select can be pre-defined, or can be made by polling the other MCU's 203.

Non-Redundant Read or Write Operations

A non-redundant operation is one in which data is written to one data storage device 209 at one location, and cannot be recovered upon a failure of that data storage device 209. Non-redundant read and write operations are the same except for the direction of data flow.

To perform a non-redundant I/O operation, the host computer 201 places an I/O command on the host bus 207 requesting data to be read from or written to a particular set of addresses at a particular host bus address. One of the MCUs 203 responds to the request, thereby accepting the task of controlling the read operation.

In one embodiment of the present invention, the MCU 203 that responds is the last MCU 203 to have had responsibility for responding to the host computer 201 on the same host bus address as the present I/O request. If no previous attempt has been made by the host computer 201 to communicate at the host bus address of the present request, the MCU 203 that is set by its address identification means 313 to the present host bus address responds to the request.

In another embodiment of the present invention, the determination as to which MCU 203 is to respond is made by assigning a single MCU 203 to the task of responding to each host command addressed to a specific host bus address. Therefore, when an I/O request is made by the host computer 201 with respect to a particular host bus address, a particular MCU 203 is responsible with responding to the request. That MCU 203 is responsible for determining which MCU 203 is to be the controlling MCU 203 based upon the logical address of the request and how busy each MCU 203 is at the time.

Once a controlling MCU 203 is selected, the controlling MCU 203 accepts a command descriptor block from the host computer 201. From the information in the command descriptor block, the controlling MCU 203 determines which other MCUs 203 are involved in the I/O operation, and sends a "disk request" message to each. Each MCU 203 that receives a disk request message queues up that command, and executes it as soon as possible (since prior I/O requests may still be pending).

Responsibility for communicating in response to an I/O request by the host computer 201 on the host bus address is passed from one involved MCU 203 to another, based upon the order in which the host computer 201 expects to see the data returned or received. Thus, each involved MCU 203 which is coupled to a data storage device 209 from which data is to be read can transfer data to the host computer 201 upon received the data from the relevant data storage device 209 and upon being given responsibility for responding to the request. Each involved MCU 203 which is coupled to a data storage device 209 to which data is to be written can accept data from the host computer 201 upon being given responsibility for responding to the request.

Each node 213 coordinates with the other nodes 213 via serial messages so that as the next data block that the host computer 201 is expecting or is sending becomes available, the node that will transmit or receive that data block connects with the host bus 207, identifies itself with the original host bus address from the I/O request being processed, and transfers the data block to/from the host computer 201. That node 213 then sends a completion message to the next node 213 in sequence, which takes over for the nest data block.

The time required to read a particular data block from any particular data storage device 209 may be so long as to make it necessary to logically disconnect that associated MCU 203 from the host computer 201. In the case of a disconnection between the host computer 201 and an MCU 203, the MCU 203 that is responsible for communicating the next pending data block must reestablish the connection with the host computer 201 on the same host bus address that the host computer 201 used to request the data.

For a read operation, each MCU 203 can begin reading immediately (assuming no other operations are pending), and thus disconnections can be minimized. Similarly, for a write operation, use of a cache or buffer allows a "write complete" message to be sent to the host computer 201 immediately upon receipt of data to be written by each MCU 203, again minimizing disconnections.

When all the data that was requested has been transmitted to/from the host computer 201, the MCU 203 that transmitted or received the last data block passes control of the host bus back to the controlling MCU 203. The controlling MCU 203 transmits an "operation complete" message to the host computer, and logically disconnects from the host computer 201.

If an error occurs, the nodes 213 cancel the operation (if that option is selected by a user during a setup procedure). If a node 213 fails to respond, the other nodes 213 will cancel the operation, or complete their data transfers (as selected by the user during a setup procedure).

Figure 5A:
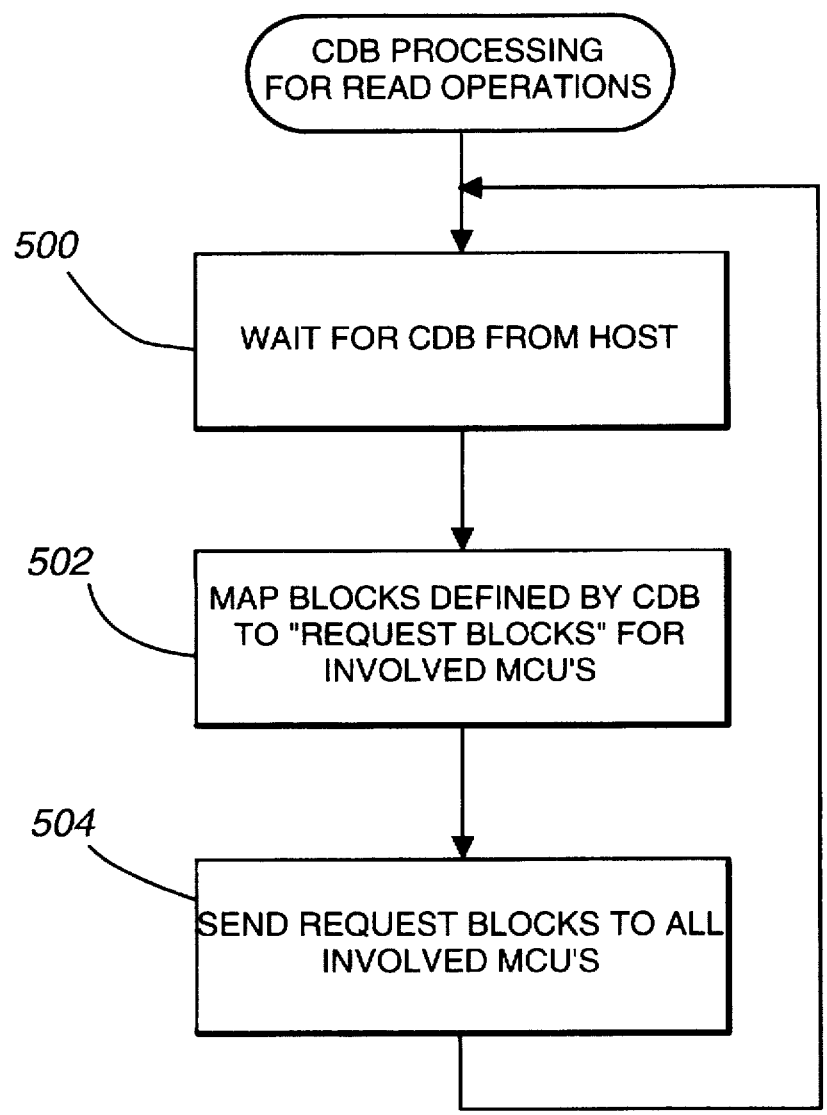
FIG. 5A and FIG. 5B are diagrams showing a non-redundant read operation in accordance with the preferred embodiment of the present invention.
Figure 5B:
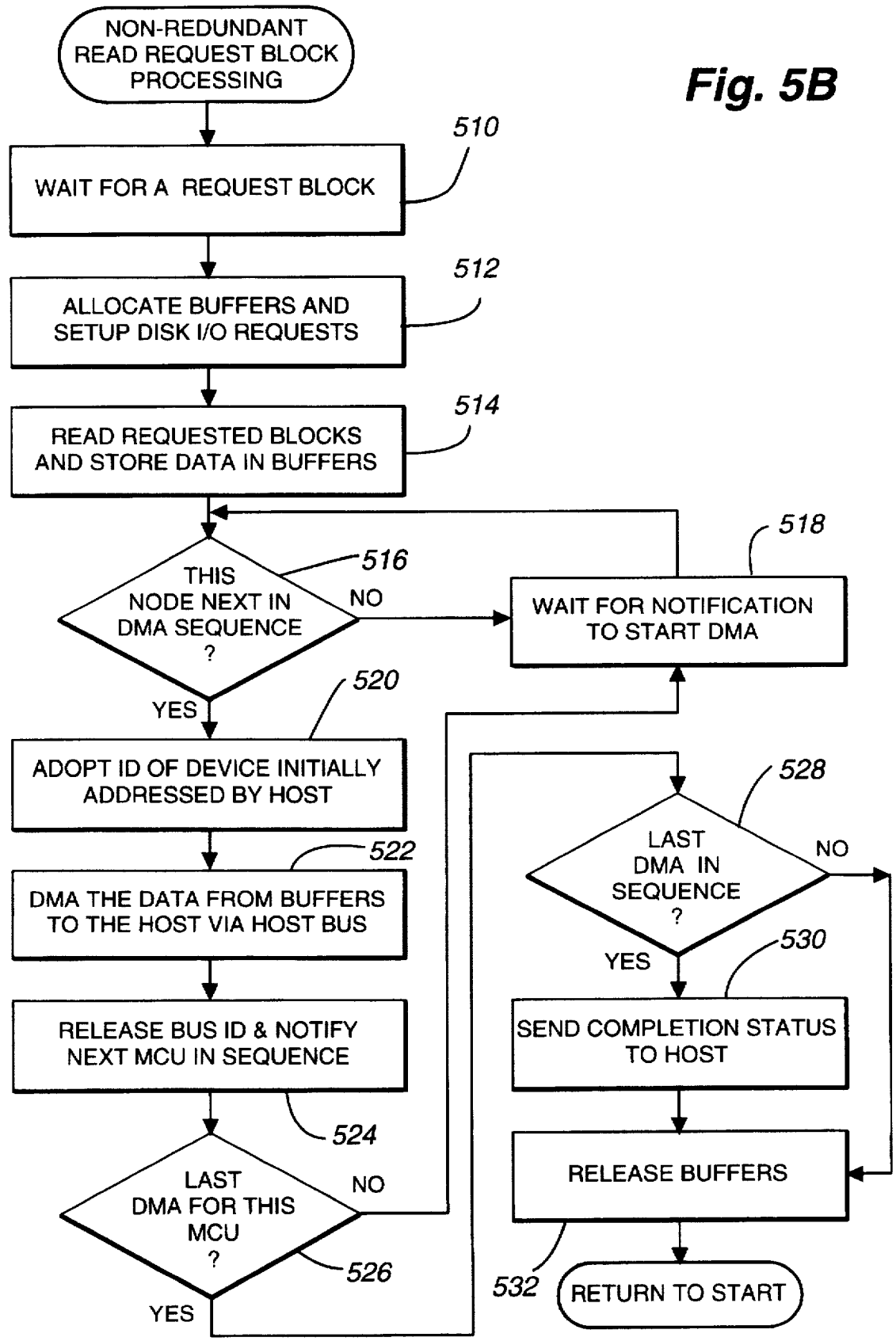

FIGS. 5A and 5B are diagrams showing a non-redundant read operation in accordance with the preferred embodiment of the present invention. FIG. 5A shows the steps for processing a command descriptor block (CDB) for read operations. When an MCU 203 is addressed by the host computer 201, the MCU 203 waits for a CDB from the host computer 201 (STEP 500). The MCU 203 then uses the logical system configuration data structure to convert the blocks defined by the CDB to "request blocks" that map the data to be read onto the logical volumes and logical disks of the array for involved MCUs 203 (STEP 502). Request blocks are messages that define for each involved MCU 203 the logical blocks that must be read by each MCU 203 from its associated data storage devices 209, and the order in which those blocks must be merged to meet the I/O request from the host computer 201. The addressed MCU 203 then sends the request blocks to all involved MCUs 203 (STEP 504).

FIG. 5B shows the processing at each node 213 of request blocks for a non-redundant read operation. Each MCU 203 waits for a request block (STEP 510). Upon receiving a request block, each involved MCU 203 allocates appropriate buffers and sets up the disk I/O request required to read the data identified in the received request blocks (STEP 512). The requested data is then read and stored in the allocated buffers (STEP 514). Each involved node 213 then tests to see whether it is the next node in the data transfer sequence, which is performed by means of a direct memory access (DMA) operation, in known fashion (STEP 516). If a node 213 is not next in the data transfer sequence, it waits for notification from another node 213 before starting its data transfer operation (STEP 518).

If a node 213 is the next in order, it adopts the identification number of the device that was initially addressed by the host computer 201 (STEP 520). The node 213 then transfers the data from its buffers to the host computer 201 over the host bus 207 (STEP 522). After the transfer is completed, the node 213 releases the identification number and notifies the next MCU 203 in sequence that the current node 213 has completed its transfer (STEP 524).

The node 213 then tests to see whether the just-completed transfer was the last data transfer required for this node 213 (STEP 526). If no, the node 213 waits for notification to start another data transfer in sequence (STEP 518). If yes, the node 213 tests to see whether it has performed the last data transfer in its required sequence, as defined in the request blocks (STEP 528). If yes, the node 213 sends a completion status message to the host computer 201 (STEP 530), releases its buffers (STEP 532), and returns to the start of the process. If no, the node 213 releases its buffers (STEP 532), and returns to the start of the process.

Figure 6:
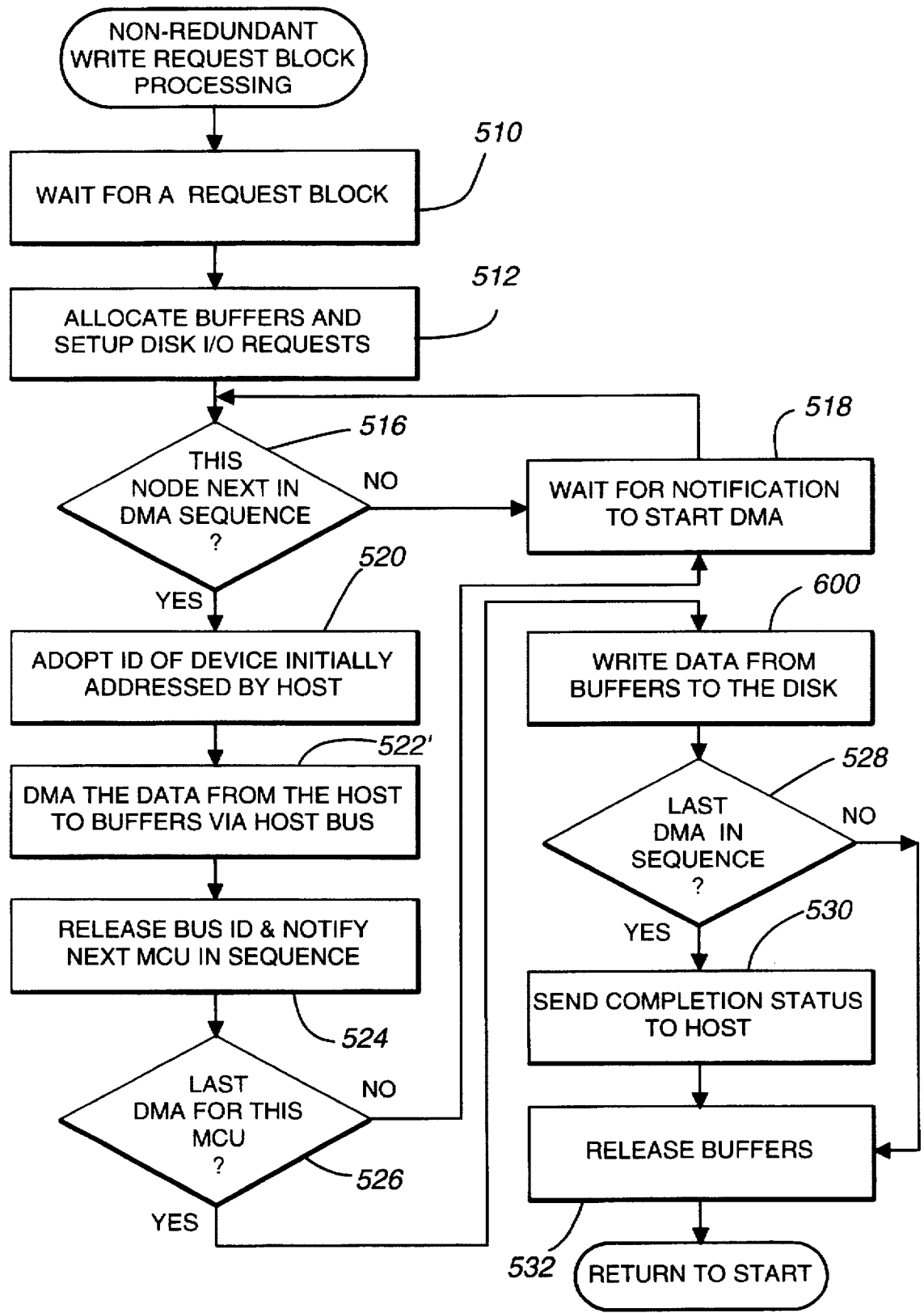
FIG. 6 is a diagram showing a non-redundant write operation in accordance with the preferred embodiment of the present invention.

FIG. 6 is a diagram showing a non-redundant write operation in accordance with the preferred embodiment of the present invention. Processing for a non-redundant write request block is very similar to the processing for a non-redundant read request block. The steps for processing a command descriptor block (CDB) for write operations is essentially the same as the process shown in FIG. 5A for read operations. Steps in FIG. 6 that correspond to similar steps in FIG. 5b are marked with similar reference numbers. The principal differences in the write operation is that instead of reading the requested data block and storing the data in allocated buffers (step 514 in FIG. 5b), the process receives data from the host computer 201 to its buffers via the host bus 207 (step 522'), and writes the data from its buffers to the appropriate data storage device 209 after the last transfer from the host computer 201 to the node 213 (step 600).

Redundant Read Operations

If no failure of a node 213 occurs, redundant read operations are carried out in the same manner as non-redundant read operations. However, when a failure occurs, each node 213 that includes a data storage device 209 that is part of the redundancy group for requested data (i.e., those data storage devices 209 containing data that has been XOR'd together, including the data storage device 209 on which the parity data is stored) reads the relevant data blocks from the stripe involved in a read request from the host computer 201. These data blocks are then transferred over the host bus 207 to the controlling MCU 203 (or to another designated MCU 203) in order to compute the XOR sum necessary to rebuild that portion of the requested data stored on the failed node 213. The rebuilt data block is then transferred to the host computer 201 in proper sequence.

If only a data storage device 209 of a node 213 has failed, but the associated MCU 203 is operational, that MCU 203 can be designated to perform the rebuild task. If the node 213 that includes the controlling MCU 203 has failed, then control of the operation is passed to another MCU 203. The choice of MCU 203 to which control is passed may be pre-set in the logical system configuration data structure (i.e., a pre-planned order of succession), or may be the first MCU 203 that detects failure of a node 213. The new controlling MCU 203 completes the read operation and communicates the successful completion to the host computer 201 by transmitting an "operation complete" message.

In the preferred embodiment of the present invention, if a "warm spare" is available, the data that was on the failed data storage device 209 is rebuilt and written to the warm spare. A warm spare is an extra node 213 which is configured such that it may replace a failed node 213. At least one warm spare is provided which replaces an entire node 213 when either a data storage device 209 or an MCU 203 fails. The warm spare node 213 is generally inactive until the failure occurs.

In the case of a RAID 1 (mirrored drives) implementation, no rebuild is required, since duplicate data is kept on paired data storage devices 209. If one of the pair fails, the requested data is simply read from the other data storage device 209 of the pair.

Figure 7:
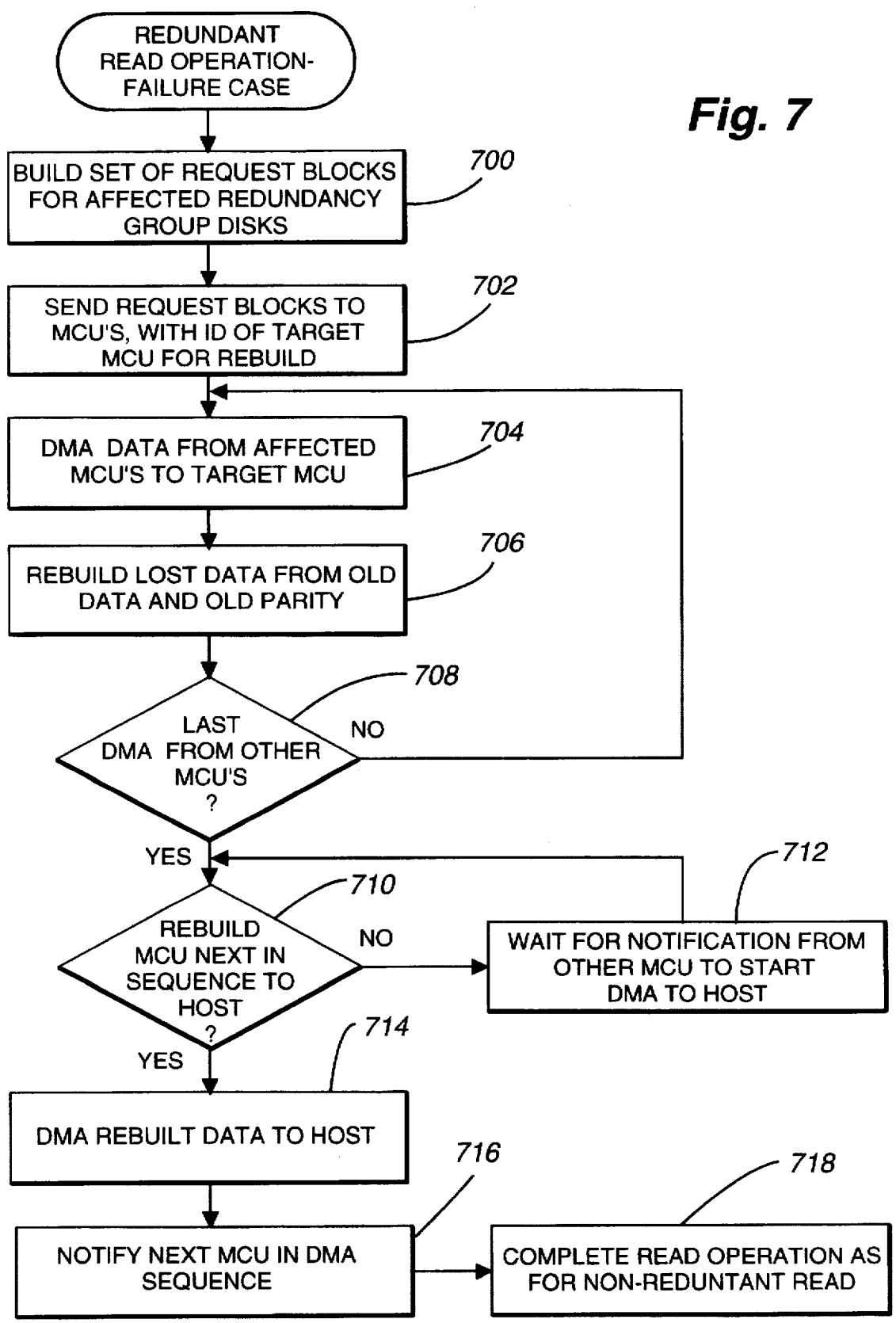
FIG. 7 is a diagram showing a redundant read operation after a failure, in accordance with the preferred embodiment of the present invention.

FIG. 7 is a diagram showing a redundant read operation after a failure, in accordance with the preferred embodiment of the present invention. A redundant read operation is essentially the same as a non-redundant read operation, except in the case of a failure. FIG. 7 shows the process steps for handling a failure. When a failure is sensed, a designated MCU 203 builds a set of request blocks for the affected redundancy group data storage devices 209. Identifying the logical blocks from which a failed logical block can be reconstructed (STEP 700). That MCU 203 then sends the request blocks to the affected MCUs 203, along with the identification of a target MCU 203 designated for performing the rebuild operation (STEP 702). The target MCU 203 typically would be the MCU that stores the parity data for the affected stripes of the redundancy group.

The MCUs 203 process the request blocks to read the affected data, and transfer that data to the target MCU 203 (STEP 704). The target MCU 203 begins to rebuild the lost data from the old data and from the old parity information (STEP 706). The target MCU 203 then tests whether it has received all necessary data from the other MCUs 203 (STEP 708). If no, further data is transferred from the affected MCUs to the target MCU (STEP 704). If yes, the target MCU then tests to see whether the data from the rebuilt MCU is next in sequence to be transferred to the host computer 201 (STEP 710). If the response to STEP 710 is no, the target MCU 203 waits for notification from the other MCUs 203 to start transferring the rebuilt data to the host computer 201 in the proper sequence (STEP 712).

If the rebuilt MCU data is next in sequence to be transferred to the host computer 201, then the target MCU 203 transfers the rebuilt data to the host computer 201 (STEP 714). The target MCU 203 then notifies the next MCU 203 in the data transfer sequence (STEP 716). Thereafter, the rest of the read operation can be completed in the same manner as for a non-redundant read operation (STEP 718).

Redundant Writes

In a RAID 1, 3, 4, or 5 implementation of the present invention, a write operation proceeds when a host bus command is transmitted from the host computer 201 via the host bus 207 to a controlling MCU 203. Once the host bus command is received by an MCU 203 that accepts the task of controlling the operation, that MCU 203 determines which of the other MCUs 203 are involved in the write operation by from the logical system configuration data structure. The involved MCUs 203 are those MCUs which are coupled to data storage devices 209 to which data is to be written (referred to as "write" MCUs), or which are in the same redundancy group as those data storage devices 209 to which data is to be written (referred to as "redundancy" MCUs). The controlling MCU 203 communicates with each of the write MCUs 203 by sending a "read old data" message on the serial communications link 212.

To avoid writing concurrently to two volumes that share the same parity block (i.e., two logical volumes within the same stripe), a lock table is maintained which prevents concurrent writes to blocks within the same stripe. Preferably, the controlling MCU 203 maintains the lock table. The controlling MCU 203 locks a range of blocks by sending a "lock-request" message over the serial communications link 212, specifying the blocks to be locked, to each MCU 203 in the same stripe as a block to be modified. The controlling MCU 203 then waits for each such MCU 203 to send back a "lock granted" message. After completion of a modification within the locked stripe, the controlling MCU 203 sends each locked MCU 203 an "unlock" message, specifying the blocks to be unlocked.

The "read old data" operation for the write MCUs 203 is necessary in order to complete a "Read-Modify-Write" (RMW) operation. Therefore, each of the data storage devices 209 to which data is to be written is instructed in sequence by its associated MCU 203 to begin reading the old data-from those logical blocks to which new data is to be written. Each write MCU 203 then takes control of the host bus 207 and transfers its old data block to the MCU 203 that contains the corresponding redundancy block. Thereafter, each write MCU 203 connects to the host computer 201 and accepts a new data block to be written over the old data block. Each write MCU 203 then causes the new block to be written to an attached data storage device 209.

In a RAID 3 or RAID 4 implementation, one MCU 203 is the redundancy MCU. In a RAID 5 implementation, each of the MCUs 203 can be a redundancy MCU, since the redundancy data is striped across the data storage devices 209 in the array.

Accordingly, the current redundancy MCU 203 reads the old parity block associated with the current stripe to be written with new data. In addition, the current redundancy MCU 203 accepts the old data block from the current write MCU and XOR's it with the old parity block. Thereafter, the current redundancy MCU 203 passively reads (or "snoops") the new data from the host bus 207 as such data is being transferred from the host computer 201 to the current write MCU 203. In this way, the new data can be XOR'd with the old parity block and old data block as the new data block is transferred to the data storage device 209 to which the new data block is to be written. An extra transmittal of the new data block to the redundancy MCU 203 is thus not required.

Responsibility for communicating with the host computer 201 in response to the host computer's 201 request for a write to a host bus address is passed from the MCU 203 coupled to the data storage device 209 on which the first data block is to be written, to the MCU 203 coupled to the data storage device 209 on which the second data block is to be written. Responsibility for satisfying the host computer's 201 write request continues to be passed from one MCU 203 to another until each data block has been transferred to the data storage devices 209 in an order that can be read back in the sequence that the host computer 201 expects.

In the preferred embodiment of the present invention, each involved MCU 203 communicates a "write complete" message to the controlling MCU 203 when the involved MCU 203 has successfully received and written a data block to its data storage devices 209. Thus, if no cache is provided in each MCU 203, the current involved MCU 203 must wait until the data storage device 209 to which data is to be written responds with an indication that the data was successfully written before that MCU 203 can transmit a "write complete" message to the controlling MCU 203. Use of a cache or buffer allows a "write complete" message to be sent to the host computer 201 immediately upon receipt of data to be written by each MCU 203.

If a failure occurs (i.e., either a data storage device 209 or an MCU 203 fails) during the read portion of a read-modify-write operation, the data on the failed node 213 is reconstructed by XOR'ing the data and redundancy information stored in the other data storage devices 209 of the redundancy group. If a failure occurs during the write portion of a read-modify-write operation, the operation completes if there is only one failure. If multiple failures occur, the operation is aborted and an error message is sent to the host by the controlling MCU 203. When either the MCU 203 or the data storage device 209 of the controlling node 213 fails during a write operation, another MCU 203 takes over control of the write operation.

Figure 8A:
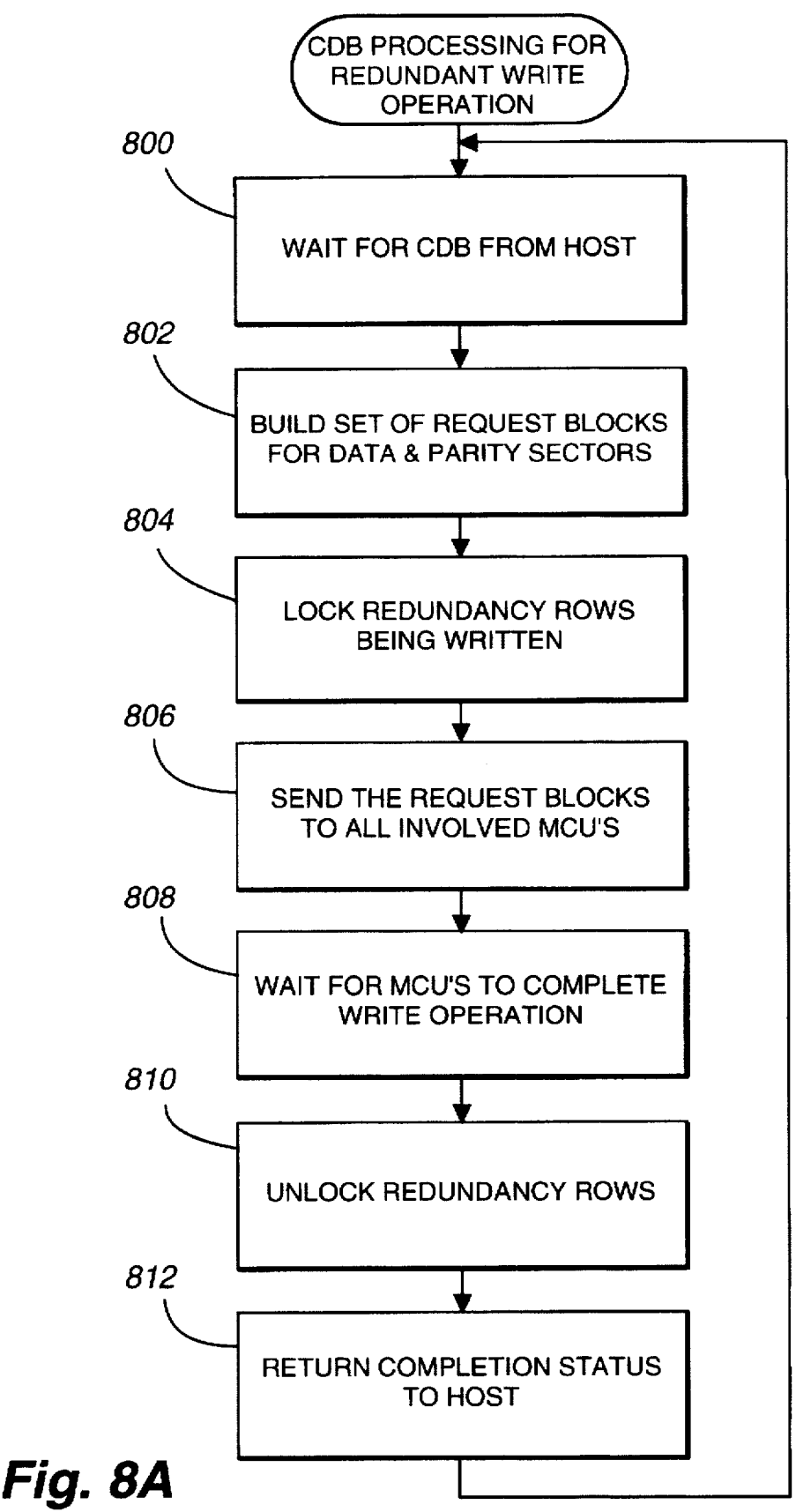
FIG. 8A and FIG. 8B are diagrams showing a redundant write operation, in accordance with the preferred embodiment of the present invention.
Figure 8B:
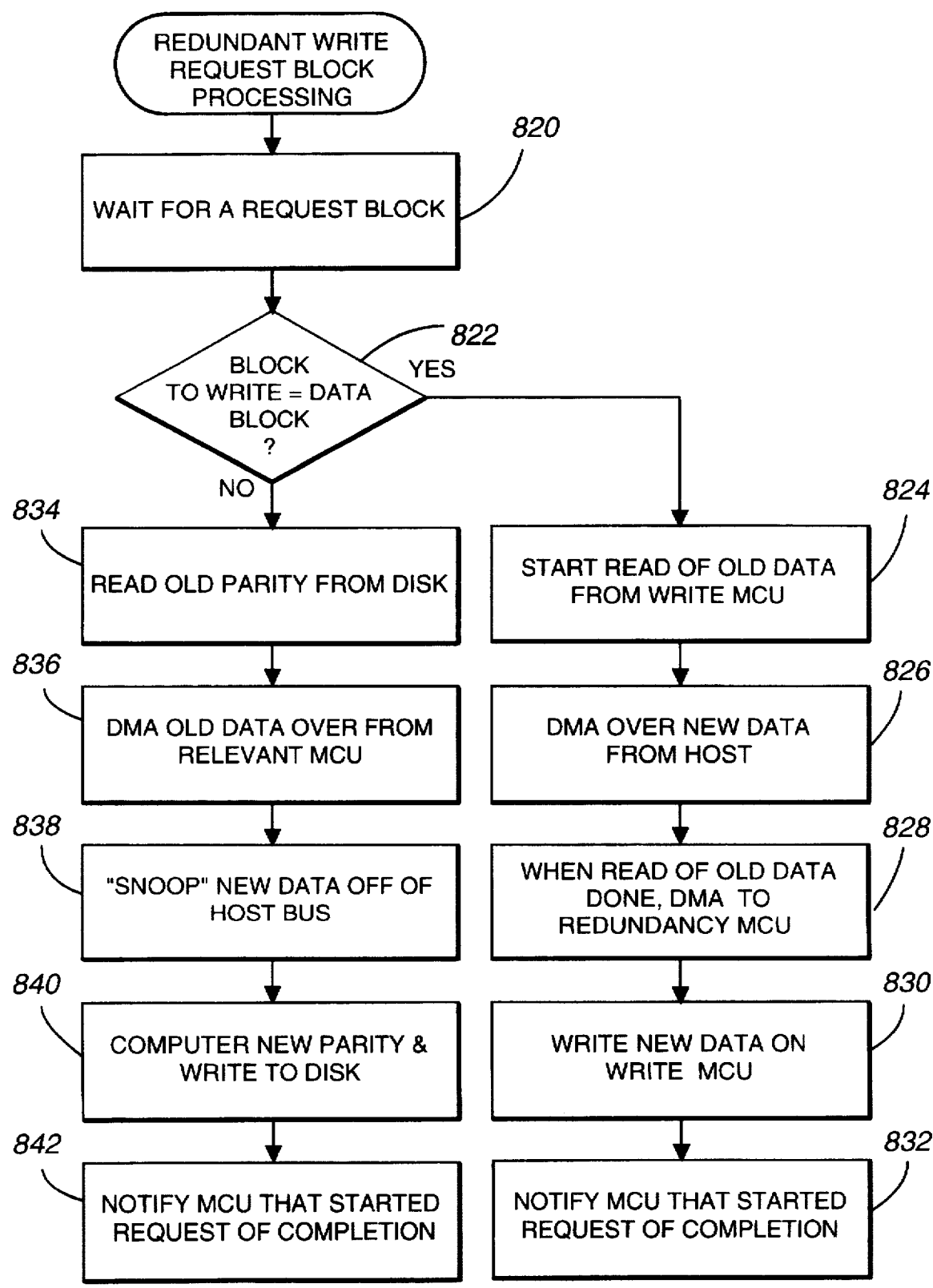

FIGS. 8A and 8B are diagrams showing a redundant write operation, in accordance with the preferred embodiment of the present invention. FIG. 8A shows the steps for processing a command descriptor block (CDB) for a redundant write operation. When an MCU 203 is addressed by the host computer 201, the MCU 203 waits for a CDB from the host computer 201 (STEP 800). When the CDB is received, the addressed MCU 203 builds a set of request blocks that map the data to be written to the logical volumes and logical disks of the array, and further maps corresponding parity sectors in the array for storing the computed parity corresponding to the written data (STEP 802). The addressed MCU 203 then sends a lock message to each affected MCU 203, in order to lock the redundancy rows from being written by any other process during the time that the current process is writing to such rows (STEP 804). The addressed MCU 203 then sends the request block to all involved MCUs (STEP 806).

The addressed MCU 203 then waits for the affected MCUs 203 to complete the write operation (described in FIG. 8b) (STEP 808). After all data has been written, the addressed MCU 203 sends an unlock message to all affected MCUs 203, to unlock the previously locked redundancy rows (STEP 810). The addressed MCU 203 then returns a completion status flag to the host computer 201 to indicate completion of the write operation (STEP 812).

FIG. 8B shows the steps for processing redundant write request blocks in accordance with the present invention. The affected MCUs 203 wait for a request block (STEP 520). Upon received a request block, each affected MCU 203 tests to see whether the block being written to it is a data block (STEP 822). If yes, the MCU 203 is a write MCU, and it initiates the process of reading the corresponding old data from one of its associated data storage devices 209 (STEP 824). Meanwhile, the write MCU transfers the new data to itself from the host computer 201 over the host bus 207 (STEP 826). When reading of the old data has been completed, the old data is transferred by the write MCU over the host bus 207 to the redundancy MCU (STEP 828). The write MCU then writes the new data to the appropriate one of its associated data storage devices 209 (STEP 830). The write MCU then notifies the controlling MCU of the completion of that phase of the write operation (STEP 832).

On the other hand, if the data to be written to an MCU 203 is a redundancy block, rather than a data block (STEP 822), then the MCU is a redundancy MCU. The redundancy MCU reads the old parity from one of its associated data storage devices 209 (STEP 834). The corresponding old data is transferred from the relevant MCU to the redundancy MCU over the host bus 207 (STEP 836). The redundancy MCU then "snoops" the corresponding new data off of the host bus 207 as the new data is being transferred by the host computer 201 to the write MCU (STEP 838). New parity is computed from the old parity, old data, and new data in known fashion, and written to the appropriate data storage device 209 controlled by the redundancy MCU (STEP 840). The redundancy MCU then notifies the controlling MCU of the completion of that phase of the write operation (STEP 842).

Automatic Rebuild

In the preferred embodiment of the present invention, a warm spare replaces an entire node 213 when either the data storage device 209 or the MCU 203 fails. The warm spare is generally inactive until the failure occurs. When a warm spare is activated upon the occurrence of a failure, an automatic rebuild is initiated which causes the information that was stored in the failed node 213 to be reconstructed in the warm spare. The information stored in each of the other nodes 213 is used to rebuild the information that was stored in the failed node 213. The warm spare receives a message on the serial communications link 212 from one of the other nodes 213 indicating that a node 213 has failed. (Detection of such failure is described above). The warm spare maintains a current copy of the logical system configuration data structure and only requires information regarding the address of the failed node 213 in order to determine which other nodes 213 must be contacted to reconstruct the data that was stored in the failed node 213. In the preferred embodiment of the present invention in which a RAID 3, 4, or 5 array is implemented, a bit-by-bit XOR'ing of the data blocks in each node 213 of the redundancy group in which the failed node is included (with the exception of the failed node 213 and the warm spare) is used to reconstruct the data that was stored in the failed node 213. That is, each data block and the associated redundancy block for each stripe is read and then transmitted over the host bus 207 to the warm spare. The MCU 203 in the warm spare XOR's the received blocks for each stripe, and then writes the sum to its attached data storage devices 209 in the corresponding stripe.

In the case of a RAID 1 (mirrored drives) implementation, no rebuild is required, since duplicate data is kept on paired data storage devices 209. If one of the pair fails, the data on the other data storage device 209 of the pair is simply copied to the warm spare.

When the failed node 213 is repaired or replaced and returned to service, the data stored in the warm spare can be written to the formerly failed node 213 and the warm spare returned to an inactive state in anticipation of a future failure. Alternatively, the repaired or replaced node 213 can be designated as the warm spare.

In any case, the rebuild operation is preferably conducted "On-line", with normal I/O operation of the host computer 201 continuing, but possibly with some degradation in performance. The on-line reconstruction process may be, for example, similar to the process described in co-pending U.S. patent application Ser. No. 07/632,182, entitled "On-line Restoration of Redundancy Information in a Redundant Array System" and assigned to the assignee of the present invention.

Examples of Use

The invention provides great versatility. Increments in storage capacity can be made by adding data storage devices 209 to the DOD bus 211 of one or more MCUs 203 ("vertical" expansion), or by adding additional MCUs 203 with at least one attached data storage device 209 ("horizontal" expansion). Horizontal expansion also increases the transaction bandwidth of the array, since more nodes 213 exist that are addressable by a host computer 201.

For example, referring to FIG. 2 each of the three nodes 213a, 213b, 213c directly controls at least one data storage device 209. By adding more nodes 213, the capacity of the system is increased approximately linearly. In addition, as more nodes 213 are added, the performance of the system increases, since each node 213 can handle a concurrent I/O request. Further, by sending messages to a target MCU 203, the other MCUs 203 can access the data storage devices 209 attached to the target node 213 by working through its MCU 203.

As another example, again referring to FIG. 2, node 213c directly controls three data storage devices 209. Further, by sending messages to the associated MCU 203c, the other MCUs 203 can access the data storage devices 209 attached to node 213c by working through its MCU 203c.

FIG. 2 also shows that other data storage devices 205 may be directly coupled to the host bus 207. Through the logical system configuration data structure, each MCU 203 can be made aware of these data storage devices 205 and can access them over the host bus 207. An advantage of having other data storage devices 205 on the host bus 207 is that they are directly addressable by each of the MCUs 203 over the host bus 207. Hence, data can be transferred between any MCU 203 and a host bus addressable data storage device 205 at the speed of the host bus 207.

Because of the economical design of the MCUs 203 and the use of "store and forward" serial messaging between nodes 213, the present invention is particularly useful for relatively small arrays, ranging from 3 to about 8 data storage devices 209. The distributed, co-operative parallel processing of the invention provides high performance at low cost.

A number of embodiments of the present invention have been described. Nevertheless, it will be understood that various modifications may be made without departing from the spirit and scope of the invention. For example, any communications protocol or bus structure can be used to interface the MCUs to the host computer, to the data storage devices, and to each other. Furthermore, although the above description refers to the communications between MCUs as being implemented on a serial communications link 212, the communications link may be any means for communicating information between the MUCs to coordinate and manage the individual data storage devices to create a coordinated array of reliable data storage device. Therefore, communications between MCUs may be made across any type of bus, or by wireless communications such as infrared or RF transmission As another example, the serial communications link 212 can be used to transfer data block between nodes if desired, which may be useful if the host bus 207 is heavily loaded with other data traffic and a rebuild operation is underway.

Accordingly, it is to be understood that the invention is not to be limited by the specific illustrated embodiment, but only by the scope of the appended claims.

We claim:

1. A distributed storage array system configured to be coupled to a host computer having a host bus, comprising:

a plurality of data storage devices for storing and retrieving data in a selected sequence;

a communications link; and a plurality of modular control units, each configured to communicate with the host computer directly over the host bus, each modular control unit being coupled to at least one corresponding data storage device and to each other modular control unit by said communications link, wherein:

at least one modular control unit includes a receiver for receiving input/output requests from the host computer directly over the host bus for determining a next data storage device of a sequence of data storage devices involved in responding to a pending one of the received input/output requests; and each modular control unit includes a receiver for receiving configuration information from another modular control unit over the communications link separately from communications over the host bus.

2. The distributed storage array system of claim 1 wherein said configuration information comprises control information for controlling said modular control units.

3. The distributed storage array system of claim 1 wherein said configuration information comprises configuration table information.

4. The distributed storage array system of claim 1 wherein said configuration information comprises a table of logical system information.

5. The distributed storage array system of claim 1 wherein said configuration information comprises information defining an array of said plurality of data storage devices.

6. The distributed storage array system of claim 1 wherein said configuration information comprises redundancy group information.

7. The distributed storage array system of claim 1 wherein said configuration information comprises logical volume information.

8. The distributed storage array system of claim 1 wherein said configuration information comprises logical disk information.

9. The distributed storage array system of claim 1 wherein said configuration information comprises information for transferring over said communications link responsibility for responding to the pending one of the received input/output requests to the modular control units corresponding to the sequence of involved data storage devices.

10. The distributed storage array system of claim 1 wherein said configuration information comprises a data structure configuration information for each of said modular control units that is communicated from each of said modular control units to another of said modular control units.

11. The distributed storage array system of claim 10 wherein said modular control units each further comprise means for updating its own configuration data structure and sending a change configuration message to another modular control unit.

12. The distributed storage array system of claim 10 wherein said data storage devices further comprise means for updating its own configuration data structure if said modular control unit receives changed configuration data and sending a change configuration message to another modular control unit.

13. The distributed storage array system of claim 1 wherein said configuration information comprises time-stamped configuration data.

14. The distributed storage array system of claim 1 wherein said modular control units each further comprise means for detecting a failure of another modular control unit.

15. The distributed storage array system of claim 14 wherein said configuration information comprises an operational message provided from each modular control unit, and said means for detecting a failure of another modular control unit comprises means for detecting an absence of said operational message.

16. The distributed storage array system of claim 11 wherein said configuration information comprises a logical volume to physical volume location map.

17. The distributed storage array system of claim 11 wherein said configuration table information comprises a redundancy group to physical volume location map.

18. The distributed storage array system of claim 11 wherein said configuration information comprises a logical data set to physical volume location map.

19. A distributed storage array system configured to be coupled to a host computer having a host bus, comprising:
a plurality of data storage devices for storing and retrieving data in a selected sequence;
a communications link;
a plurality of modular control units, each configured to communicate with the host computer directly over the host bus, each modular control unit being coupled to at least one corresponding data storage device and to each other modular control unit by said communications link, wherein:
at least one modular control unit includes a receiver for receiving input/output requests from the host computer directly over the host bus for determining a next data storage device of a sequence of data storage devices involved in responding to a pending one of the received input/output requests; and each modular control unit includes a receiver for receiving configuration information from another modular control unit over the communications link separately from communications over the host bus; and
a cache for caching at least some I/O transactions handled by said modular control units.

20. The distributed storage array system of claim 19 wherein said at least one modular control unit including the receiver for receiving the input/output requests further comprises means for generating a write complete message to the host computer when data to be written by said modular control unit is written to said cache.

21. The distributed storage array system of claim 19 wherein said cache is sized to enable said modular control units to process a transfer without logically disconnecting from the host computer.

22. The distributed storage array system of claim 19 wherein the at least selected ones of said plurality of modular control units includes a RAM and wherein said cache for caching at least some transactions comprises the RAM included to form a portion of at least the selected ones of said plurality of modular control units, each RAM forming a cache for an associated modular control units.

23. The distributed storage array system of claim 22 wherein the at least selected ones of said plurality of modular control units including the RAM comprises each of said plurality of modular control units.

24. The distributed storage array system of claim 19 wherein one of said modular control units is dedicated to caching.

25. A distributed storage array system configured to be coupled to a host computer having a host bus, comprising:
a plurality of data storage devices for storing and retrieving data in a selected sequence;
a communications link; and
a plurality of modular control units, each configured to communicate with the host computer directly over the host bus, each modular control unit being coupled to at least one corresponding data storage device and to each other modular control unit by said communications link, wherein:
at least one modular control unit includes a receiver for receiving input/output requests from the host computer directly over the host bus for determining a next data storage device of a sequence of data storage devices involved in responding to a pending one of the received input/output requests; and
each modular control unit includes a receiver for receiving information from another modular control unit over the communications link separately from communications over the host bus.

26. The distributed array system of claim 25 wherein at least a portion of said information received by each modular control unit comprises configuration information.

27. The distributed array system of claim 25 wherein at least a portion of said information received by each modular control unit comprises control information.

28. The distributed array system of claim 25 wherein at least a portion of said information received by each modular control unit comprises data.

29. The distributed array system of claim 25 wherein at least a portion of said information received by each modular control unit comprises redundancy data.

* * * * *